Patented Oct. 12, 1943

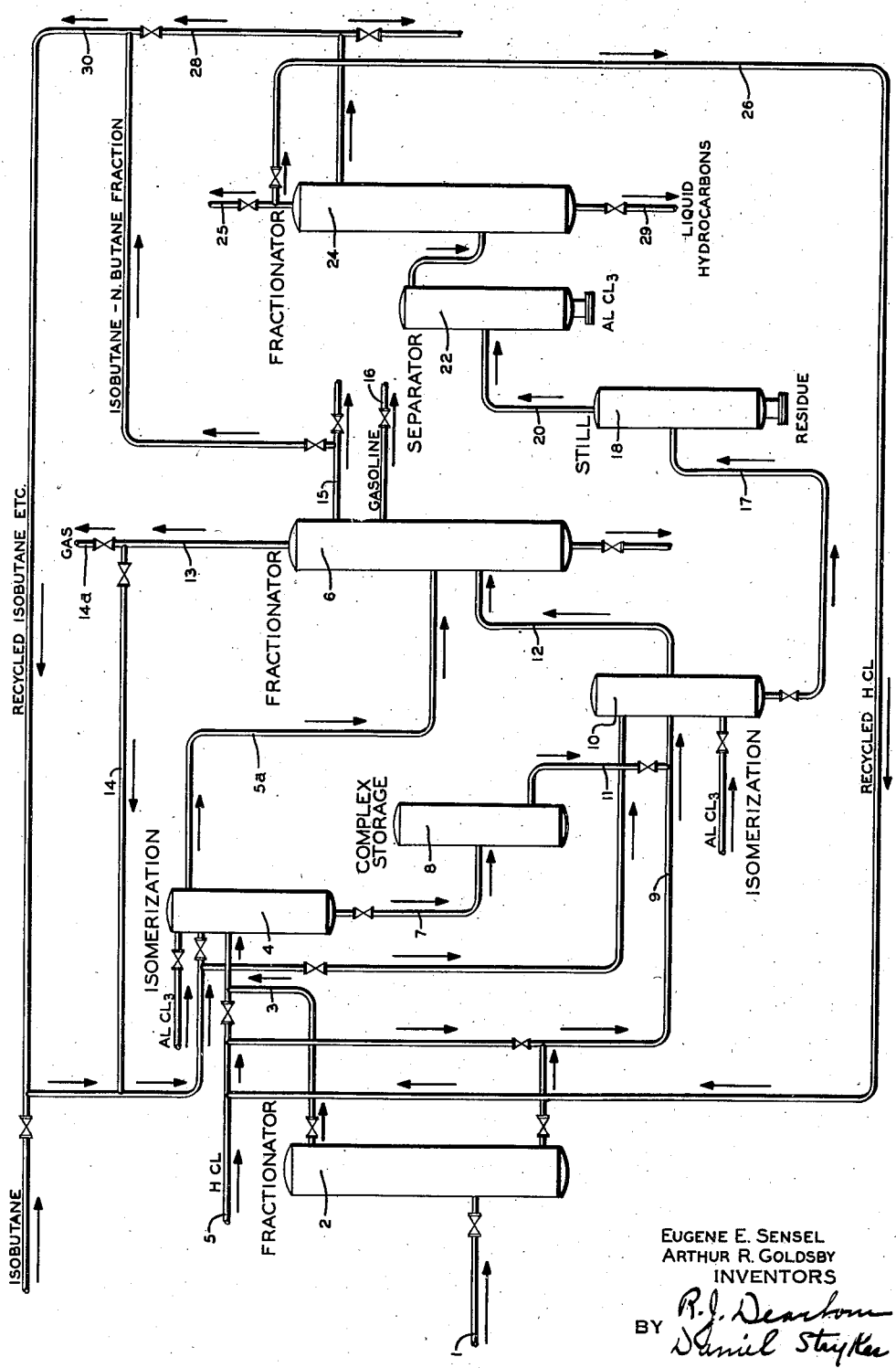

2,331,429

UNITED STATES PATENT OFFICE 2,331,429

ISOMERIZATION OF HYDROCARBONS

Eugene E. Sensel and Arthur R. Goldsby, Beacon, N. Y., assignors, by mesne assignments, to The Texas Company, New York, N. Y., a corporation of Delaware Application July 19, 1940, Serial No. 346,318

9 Claims. (Cl. 260—683.5)

This invention relates to the treatment of hydrocarbons and particularly to treatment with an isomerization catalyst to improve the antiknock value and volatility.

Broadly the invention contemplates subjecting gasoline hydrocarbons, such as contained in straight run petroleum naphtha, to isomerization by contact with a metallic halide in the presence of a hydrogen halide. It involves in part the employment of a catalyst comprising a metallic halide-hydrocarbon complex under conditions such that the complex is effective as an isomerization catalyst.

In accordance with the invention the feed hydrocarbons are treated with fresh metallic halide, such as aluminum chloride, under isomerizing conditions at relatively low temperature, during which treatment the catalyst, at least in part, is converted to a metallic halide-hydrocarbon complex. The complex is subsequently subjected to contact with feed hydrocarbons at somewhat higher temperatures, such that it is effective in isomerizing normal paraffin constituents of the feed.

According to one form of the invention, straight-run naphtha is separated into lower boiling and higher boiling fractions, respectively. The lower boiling fraction is subjected to isomerization by contact with an anhydrous metallic halide in the presence of an anhydrous hydrogen halide. The higher boiling fraction is subjected to isomerization by contact with a catalyst comprising a metallic halide-hydrocarbon complex in the presence of a hydrogen halide at a somewhat higher reaction temperature. The catalyst complex used in the treatment of the higher boiling fraction advantageously comprises the complex formed in the treatment of the lower boiling fraction.

The isomerized hydrocarbons produced from the separate treatment of the individual naphtha fractions may be disposed of separately or may be blended in any proportion to produce motor fuel of desired boiling range characteristics.

The invention also contemplates subjecting the metallic halide-hydrocarbon complex remaining after treatment of the higher boiling fraction to destructive distillation so as to decompose it and recover the metallic halide by sublimation or by distillation. The recovered halide is then used for the further treatment of low boiling naphtha-hydrocarbons.

Decomposition of the complex results in the formation of gaseous and low boiling hydrocarbons comprising mainly saturated hydrocarbons, including a large amount of isobutane. Some of the hydrocarbons so recovered from the complex may be recycled through the process as will be explained later or may be blended with the final product.

Metallic halide catalysts useful in the process include anhydrous metallic halides such as the chlorides, bromides, iodides and fluorides of aluminum, beryllium, titanium, silicon, germanium, boron, zinc, iron, zirconium, tin, mixtures thereof and the like, with or without the presence of anhydrous hydrogen halides, such as hydrogen chloride, as promoters of the reaction.

The hydrogen halide promoter may be added as such or may be generated in situ from the metallic halide by adding the required amount of water, steam or alkyl halide which reacts with the metallic halide.

The invention has particular application to the treatment of straight run naphtha. Straight run gasoline or naphtha usually comprises hydrocarbons boiling over the range from about 80 or 100° F. to about 400° F. or even higher. We have discovered that it is advantageous to segregate from such stock a lower boiling fraction having an end boiling point of around 160° to 200° F., and preferably not in excess of about 220° F. This fraction is then subjected to contact with aluminum chloride at a temperature of around 212° F. or at a temperature in the range of about 175° to 270° F. such that isomerization of its normal paraffin constituents occurs. The higher boiling portion of the stock comprising mainly hydrocarbons boiling above 200° or 220° F. is then subjected to contact with aluminum chloride-hydrocarbon complex such as is formed in the treatment of the lower boiling fraction. The treatment of the higher boiling fraction is advantageously effected at a temperature above 270° F. and usually around 350° to 450° F.

In general, aromatic as well as other constituents which promote and cause objectionable catalyst deterioration are concentrated for the most part in the higher boiling portion of the naphtha, that is, in the portion boiling above about 200° F. These constituents, having a high degree of reactivity with the catalyst, form complexes or sludge. The presence of this complex or sludge material is objectionable because it is largely ineffective as a catalyst at temperatures substantially below 300° F. and which low temperatures are effective in the isomerization of the lower boiling paraffins.

Therefore, by isomerizing the lower boiling naphtha hydrocarbons in the absence of the higher boiling portion of the naphtha, less deterioration of the catalyst occurs. However, such complex compounds as are formed when treating these lower boiling fractions can be utilized in the separate treatment of the higher boiling fraction. We have discovered that this complex is effective as an isomerization catalyst at temperatures of around 300° F. and above. At these higher temperatures it is effective in isomerizing the higher boiling naphtha constituents and also in otherwise converting them to hydrocarbons of higher anti knock value. Moreover, it is not only effective in isomerizing the higher boiling hydrocarbons but it is also effective in isomerizing lower boiling hydrocarbons at elevated temperatures to effect some improvement in the antiknock value.

Thus, according to a modification of the invention, a hydrocarbon feed, such as a pentane-hexane fraction of straight run gasoline, is treated with aluminum chloride in the presence of hydrogen chloride at a temperature of around 212° F., for example, so that there is substantial conversion of normal paraffin to branched chain hydrocarbons. During the treatment the catalyst is substantially converted to aluminum chloride-hydrocarbon complex. The resulting complex is subjected to further contact with fresh feed hydrocarbons in the presence of hydrogen chloride, but at a more elevated temperature, in the range 270° F. and above, such that substantial conversion to branched chain hydrocarbons occurs.

This type of operation may be carried out continuously with continuous charging of a stream of feed hydrocarbons to a tower containing solid catalyst. Liquid aluminum chloride-hydrocarbon complex is continuously withdrawn from the tower and subjected to contact with another stream of feed hydrocarbons at the more elevated temperature.

It is found that the yield of gasoline and gas produced from the pentane-hexane fraction, with the fresh catalyst and with the complex, is about the same and of the order of 95% by volume of the feed, the yield of gas being approximately the same in each case. The octane number of the gasoline produced with the fresh catalyst is about 79 CFRM and with the complex about 70 CFRM, as compared with an octane of 62 CFRM for the pentane-hexane charge.

By way of example, a straight run gasoline derived from Oklahoma crude and having an end point of about 363° F., with an antiknock value of around 50.7 (CFRM), was separated into two fractions. The low boiling fraction, amounting to about 21% by volume of the gasoline, had an initial boiling point of 100° F. and an end boiling point of 219° F. The antiknock value of this fraction, prior to isomerization was about 67 (CFRM). The higher boiling fraction, amounting to 79% of the gasoline, had an initial boiling point of 207° F. and an end boiling point of 380° F. This fraction had an antiknock value of about 46 (CFRM).

1260 parts by weight of the low boiling fraction and 267 parts by weight of powdered commercial anhydrous aluminum chloride were charged to a reactor to which was added a small amount of water amounting to about 0.5% by weight of the hydrocarbon charge. The water was added for the purpose of generating sufficient hydrogen chloride to activate the catalyst. The charge of hydrocarbon and catalyst was subjected to agitation and maintained at a temperature of around 222° F. for a period of about two and one-half hours, the reaction being effected under a pressure of about 160 pounds per square inch gauge.

At the end of the reaction the hydrocarbon layer was removed from the reactor, leaving the catalyst substantially entirely in the form of a liquid aluminum chloride-hydrocarbon complex. 1260 parts by weight of the higher boiling gasoline fraction were then charged to the vessel containing the complex. In addition, about 15 parts by weight of fresh aluminum chloride and about 6 parts by weight of water were added to the vessel for the purpose of generating hydrogen chloride with which to activate the reaction. The charge mixture was subjected to agitation and maintained at a temperature of around 350° F. for a reaction time of about two hours, after which the products of reaction were removed and analyzed.

The yields and octane numbers of the converted gasoline are indicated in the following tabulation. For purposes of comparison the yield and octane number of the gasoline obtained by isomerizing the unfractionated straight run gasoline are indicated. The straight run gasoline was subjected to contact with fresh anhydrous aluminum chloride in the presence of hydrogen chloride at a temperature of around 218 to 234° F. over a period of about two and one-half hours.

|  | Low boiling fraction | High boiling fraction | Unfractionated gasoline |
| --- | --- | --- | --- |
| Yields, percent by weight of charge: |  |  |  |
| Isomerized hydrocarbons (gaseous and liquid) | 92.3 | 89.2 | 89.4 |
| Hydrocarbon in the form of liquid complex | 5.7 | 8.8 | 8.6 |
| Loss | 2.0 | 2.0 | 2.0 |
| Analysis of isomerized hydrocarbons, percent by volume: |  |  |  |
| Naphtha (debutanized) | 88.2 | 81.3 | 94.6 |
| Gas | 10.2 | 17.7 | 2.3 |
| Loss | 1.6 | 1.0 | 3.1 |
| Octane number of naphtha (CFRM) | 79.9 | 61.2 | 59.0 |

As indicated by the foregoing tabulation, the treatment resulted in raising the octane number of the low boiling fraction from 67 to 79.9. In the case of the high boiling fraction the octane number was raised from 46 to 61.2. Thus, the weighted average for the octane number of the converted fractions is about 65.1, which is considerably better than the value of 59.0 obtained in the case of the gasoline treated as a whole.

The aluminum chloride-hydrocarbon complex remaining after treatment of the higher boiling fraction, when subjected to a temperature of around 640° F. under substantially atmospheric pressure, decomposes, forming a distillate amounting to about 60 to 70% or more of the complex and comprising off-gas and sublimed aluminum chloride. If desired the complex may be subjected to distillation under superatmospheric pressure.

The aluminum chloride can be separated from the off-gas and will amount to around 65% or more of the entire aluminum chloride present in the complex. The off-gas portion of the distillate will comprise around 26% or more of the complex and comprises hydrogen chloride, hydrogen, and mainly saturated petroleum hydrocarbons ranging from methane to isopentane and above.

The following is an analysis of the off-gas (basis, hydrogen chloride-free gas) and it shows the relative proportion of the hydrocarbon constituents:

|  | Per cent by volume |
|---|---|
| Hydrogen | 31.7 |
| Methane | 4.6 |
| Ethylene | 0.0 |
| Ethane | 1.7 |
| Propylene | 1.8 |
| Propane | 25.2 |
| Isobutane | 22.4 |
| Normal butane | 5.7 |
| Butylenes | 1.3 |
| Isopentane | 4.1 |
| Above isopentane | 1.5 |

As is apparent from the foregoing, the hydrocarbons in the off-gas are of highly saturated character with only a small amount of unsaturated hydrocarbons being present.

The invention will be understood further upon reference to the accompanying drawing showing a flow diagram for carrying out the process of the invention wherein the naphtha is fractionated into fractions and the resulting fractions separately treated.

Referring to the drawing, a straight run 400° F. end point naphtha, having an antiknock value of 50 (CFRM), such as distilled from East Texas crude petroleum, is drawn from a source not shown through a pipe 1 and introduced to a fractionator 2. The fractionation is regulated so as to produce a low boiling fraction having a distillation range with an initial boiling point of around 80° to 100° F. and an end boiling point of around 150° to 220° F.

This low boiling fraction is conducted through a pipe 3 to an isomerization plant 4. In the plant 4 the hydrocarbons are brought into contact with anhydrous aluminum chloride at a temperature ranging from about 175° to 270° F. and under a pressure which may range from atmospheric to around 700 pounds per square inch gauge, and such that substantial conversion of the normal paraffins to isoparaffins occurs.

The reaction may be carried out in either liquid phase or vapor phase and is facilitated by means of a promoter, such as hydrogen chloride, conducted from a source not shown through a pipe 5.

The plant 4 may comprise a tower type of reaction vessel packed with the catalyst in the form of lumps or suspended on a solid carrier agent, such as clay, silica gel, activated alumina, brick, pumice, etc. If desired, either an agitated vessel type, or coil type, of reactor may be employed. Provision may be made for the continuous introduction of fresh makeup AlCl₃, as indicated.

The isomerized hydrocarbons are conducted from the plant 4 through a pipe 5a to a fractionator 6 to which reference will be made later.

These treated hydrocarbons will usually amount to about 95% by volume of the low boiling fraction charged to the isomerization plant 4. About 93% of these treated hydrocarbons will comprise butane-free naphtha having an end point of about 250° F. with an antiknock value of 75 to 83. The remaining 7% comprises saturated hydrocarbons, including butanes and propane, and, in addition, some hydrogen chloride.

The remaining 5% of the feed is converted into a hydrocarbon-aluminum halide complex which is drawn off through a pipe 7 to a tank 8. It may be augmented with complex material drawn from some other source.

The higher boiling fraction formed in the fractionator 2 will have a boiling range of from around 150 or 200 to about 400° F. This fraction is drawn off through a pipe 9 and introduced to an isomerization plant 10 wherein it is subjected to contact with aluminum chloride-hydrocarbon complex introduced through a pipe 11 from the tank 8 previously referred to.

The complex is in substantially liquid form and is advantageously mixed with the hydrocarbon fraction passing to the plant 10. The plant 10 may comprise a reaction stage and a settling stage, feed hydrocarbons and complex being subjected to intimate mixing in a reaction stage and the resulting mixture subjected to settling in a settling stage. The catalyst complex settling out in the settling stage may be drawn off continuously and, if desired, recycled in part, at least, to the reaction stage.

The reaction temperature in the reaction stage of plant 10 is advantageously maintained at a temperature above 270° F. and ranging from around 350 to 450° F., while the pressure may range from around atmospheric to about 700 pounds. Some fresh AlCl₃, as well as hydrogen chloride, may be introduced continuously to the unit 10 as indicated in order to further the activity of the complex.

The isomerized hydrocarbons are removed from plant 10 and conducted through a pipe 12 to the fractionator 6 previously mentioned.

The isomerized hydrocarbons entering the fractionator 6 from pipe 12 will comprise about 80% by volume of naphtha having an antiknock value of approximately 61 or better. The remainder will comprise gaseous material of which about 70 to 80% is isobutane, the rest being essentially propane.

The products of isomerization are subjected to fractionation in the fractionator 6 so as to remove gaseous constituents, including hydrogen chloride. Thus, the hydrogen chloride may be discharged from the fractionator through a pipe 13 and recycled to the isomerization plants 4 and 10. A normally gaseous hydrocarbon fraction comprising mainly isobutane may be removed from the fractionator through a pipe 15, while a gasoline fraction of desired boiling range is produced and withdrawn through a pipe 16.

It is to be understood that a single fractionator 6 is shown as a matter of convenience, and that two or more fractionators may be employed in practice. In the first fractionator, the reaction products are stabilized to remove normally gaseous constituents overhead. The remaining liquid material comprising gasoline hydrocarbons and heavier is then removed to a second fractionator where the gasoline is distilled overhead from any heavier material which is discharged as bottoms. The normally gaseous constituents may be passed to a fractionator where fixed gases and HCl are removed overhead for recycling through line 14, and an isobutane fraction removed as a side stream, or as bottoms along with n-butane, for use in other processes or for recycling to the isomerization vessels 4 and 10. Where it is not desired to make separate use of the isobutane, the separate fractionation of the off-gasses from such stabilization operation may be omitted, and the entire fraction including isobutane and HCl recycled directly to the isomerization vessels 4 and 10 as shown in the drawing.

In order to prevent build-up of fixed gases in the system, a portion of the recycle gases are bled off from time to time by the gas discharge pipe 14a.

The spent catalyst is drawn off from the plant 10 through a pipe 17 and is conducted to a still 18 wherein it is subjected to destructive distillation at a temperature of around 600 to 750° F. and under a pressure which may range from around atmospheric to about 50 pounds gauge.

The products of distillation are removed from the still through a pipe 20 while the residue comprising mainly carbonaceous material is drawn off through a suitable man-hole similar to the removal of coke from a coking drum.

The products of distillation are passed to a separator or condenser 22 in which aluminum chloride condenses and accumulates and from which it is subsequently removed through a suitable man-hole. The vaporous material is passed from the separator 22 to a suitable fractionating system 24 to effect separation into its components.

Thus, hydrogen chloride together with fixed gases may be discharged through a pipe 25 or recycled, all or in part, through a pipe 26 to the pipe 5 previously mentioned. To prevent build-up of fixed gases, such as methane, ethane, etc., the gas is periodically bled off through pipe 25, a fraction comprising mainly iso and normal butane is separated and drawn off through a pipe 28 communicating with a pipe 30 through which the butanes are recycled, if desired, to the isomerization unit 4.

It is advantageous to recycle isobutane to the isomerization reaction since it has been found that the presence of such low boiling isoparaffin during isomerization of higher boiling naphtha hydrocarbons inhibits side reactions and catalyst deterioration. It also inhibits the formation of higher boiling material, above the gasoline boiling range.

The remaining hydrocarbons comprising normally liquid hydrocarbons are removed as a liquid fraction from the fractionator through a pipe 29 and are disposed of as may be desired.

Obviously many modifications and variations of the invention, as hereinbefore set forth, may be made without departing from the spirit and scope thereof, and therefore only such limitations shoulde be imposed as are indicated in the appended claims.

We claim:

1. The method for improving the antiknock value of petroleum naphtha wherein the naphtha is subjected to contact with an isomerization catalyst to effect substantial conversion of hydrocarbon constituents of the naphtha into hydrocarbons of more branched chain character which comprises separating the naphtha into a fraction comprising normally liquid hydrocarbons boiling below about 220° F. and a fraction comprising hydrocarbons boiling above 220° F., passing the lower boiling fraction to a primary reaction zone, subjecting the low boiling fraction in the presence of hydrogen halide to contact therein with metallic halide isomerization catalyst maintained under isomerizing conditions such that isomerization of hydrocarbons to highly branched chain hydrocarbons constitutes the principal reaction, forming metallic halide-hydrocarbon complex in said primary zone, withdrawing converted naphtha from the primary zone, withdrawing from said primary zone metallic halide-hydrocarbon complex which is substantially ineffective as an isomerization catalyst under the conditions prevailing therein, passing the withdrawn complex to a secondary reaction zone, passing said higher boiling fraction to the secondary zone, subjecting the hydrocarbons in the secondary zone to contact with said complex at a temperature substantially above that prevailing in the primary zone such that substantial conversion to branched chain hydrocarbons occurs as the principal reaction, withdrawing converted naphtha from the secondary zone and separating gasoline hydrocarbons of highly branched chain character from the hydrocarbons withdrawn from both said zones.

2. The method according to claim 1 in which the catalyst employed in the primary reaction zone is aluminum chloride.

3. The method according to claim 1 in which the reaction temperature maintained in the secondary reaction zone is substantially above 270° F.

4. The method according to claim 1 in which the temperature maintained in the primary reaction zone is in the range about 175° F. to about 270° F.

5. The method for improving the antiknock value of petroleum naphtha wherein the naphtha is subjected to contact with an isomerization catalyst to effect substantial conversion of hydrocarbon constituents of the naphtha into hydrocarbons of more branched chain character which comprises separating the naphtha into a normally liquid lower boiling fraction which is relatively free from aromatic hydrocarbons and a higher boiling fraction, passing the lower boiling fraction to a primary reaction zone, subjecting the low boiling fraction in the presence of hydrogen halide to contact therein with aluminum halide isomerization catalyst maintained under isomerizing conditions such that isomerization of hydrocarbons to highly branched chain hydrocarbons constitutes the principal reaction, forming aluminum halide-hydrocarbon complex in said primary zone, withdrawing converted naphtha from the primary zone, withdrawing from said primary zone aluminum halide-hydrocarbon complex which is substantially ineffective as an isomerization catalyst under the conditions prevailing therein, passing the withdrawn complex to a secondary reaction zone, passing said higher boiling fraction to the secondary zone, subjecting the hydrocarbons in the secondary zone to contact with said complex at a temperature substantially above that prevailing in the primary zone such that substantial conversion to branched chain hydrocarbons occurs as the principal reaction, withdrawing converted naphtha from the secondary zone and separating gasoline hydrocarbons of highly branched chain character from the hydrocarbons withdrawn from both said zones.

6. The method for improving the antiknock value of petroleum naphtha wherein the naphtha is treated with an isomerization catalyst at a temperature in the range about 175 to 450° F., which comprises separating the naphtha into a lower boiling fraction which is relatively free from aromatic hydrocarbons and a higher boiling fraction, subjecting the lower boiling fraction in the presence of hydrogen halide to contact with metallic halide isomerization catalyst maintained under isomerizing conditions at a moderate temperature within said temperature range and such that isomerization constitutes the principal reaction, forming metallic halide-hydrocarbon complex during said moderate temperature reaction which is substantially inactive as a catalyst at said temperature, withdrawing converted hydrocarbons, withdrawing said complex from said moderate temperature reaction, separately subjecting the higher boiling naphtha fraction in the presence of hydrogen halide to contact with said complex at a temperature substantially above said moderate temperature but within said temperature range such that substantial isomerization occurs as the principal reaction, withdrawing converted naphtha from said higher temperature reaction and separating gasoline hydrocarbons of improved antiknock value from the hydrocarbons withdrawn from both said reactions.

7. The process according to claim 6 in which the lower boiling fraction comprises normally liquid hydrocarbons boiling below 220° F. and the higher boiling fraction comprises hydrocarbons boiling above 220° F.

8. The method of isomerizing petroleum naphtha wherein the naphtha is treated with a metallic halide isomerization catalyst at a temperature in the range about 175 to 450° F. in the presence of added isobutane which comprises separating the naphtha into a lower boiling fraction which is relatively free from aromatic hydrocarbons and a higher boiling fraction, subjecting the lower boiling fraction in the presence of hydrogen halide to contact with metallic halide isomerization catalyst maintained under isomerizing conditions at a temperature not in excess of about 270° F. such that isomerization constitutes the principal reaction, forming metallic halide hydrocarbon complex during said reaction which is substantially inactive as a catalyst at said temperature, separately subjecting said complex to contact with said higher boiling fraction in the presence of hydrogen halide at a temperature above 270° F. such that isomerization constitutes the principal reaction, continuing said contact between feed hydrocarbons and complex to accumulate spent complex which is relatively ineffective as an isomerization catalyst under the conditions prevailing, separately subjecting said spent complex to destructive distillation to liberate metallic halide and normally gaseous hydrocarbons rich in isobutane, separating from said normally gaseous hydrocarbons a fraction comprising mainly iso and normal butane, and recycling said $C_4$ fraction at least in part to said isomerization reactions.

9. The method according to claim 8 in which the metallic halide isomerization catalyst is aluminum halide.

EUGENE E. SENSEL.
ARTHUR R. GOLDSBY.